US012679523B2

(12) United States Patent
Bedus et al.

(10) Patent No.: US 12,679,523 B2
(45) Date of Patent: Jul. 14, 2026

(54) AIRCRAFT WITH A TRANSPARENT WALL FIXED TO A STRUCTURE VIA A SHOCK PROTECTION SYSTEM

(71) Applicant: AIRBUS HELICOPTERS, Marignane Cedex (FR)

(72) Inventors: Olivier Bedus, Marignane Cedex (FR); Sébastien Andral, Marignane Cedex (FR); Philippe Monboisse, Marignane Cedex (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 0 days.

(21) Appl. No.: 19/180,283

(22) Filed: Apr. 16, 2025

(65) Prior Publication Data

US 2025/0388313 A1     Dec. 25, 2025

(30) Foreign Application Priority Data

Jun. 24, 2024     (FR) ................................. FR2406768

(51) Int. Cl.
B64C 1/14          (2006.01)
F16F 7/12          (2006.01)
(52) U.S. Cl.
CPC ............ B64C 1/1492 (2013.01); F16F 7/121 (2013.01)
(58) Field of Classification Search
CPC ...................... B64C 1/1492; B64D 2045/0095
See application file for complete search history.

(56) References Cited

U.S. PATENT DOCUMENTS

| | | | | |
|---|---|---|---|---|
| 3,682,463 | A | | 8/1972 | Radimirsch et al. |
| 3,843,193 | A | * | 10/1974 | Krings ..................... B60J 10/70 |
| | | | | 188/371 |
| 4,204,374 | A | * | 5/1980 | Olson ................... B64C 1/1492 |
| | | | | 244/121 |

(Continued)

FOREIGN PATENT DOCUMENTS

| | | | |
|---|---|---|---|
| CA | 3066586 A1 | 7/2020 | |
| EP | 1788273 A1 * | 5/2007 | .............. F16F 7/121 |

(Continued)

OTHER PUBLICATIONS

French Search Report for French Application No. FR2406768, Completed by the French Patent Office, Dated Feb. 6, 2025, 9 pages.

(Continued)

*Primary Examiner* — Richard Green
(74) *Attorney, Agent, or Firm* — BROOKS KUSHMAN P.C.

(57) ABSTRACT

An aircraft provided with a transparent wall interposed between an internal environment located in the aircraft and an external environment, the transparent wall being fixed to a supporting structure of the aircraft by a fixing system, the transparent wall having an internal face facing the internal environment and an external face facing the external environment. The fixing system comprises at least one martyr energy-absorbing pad, the energy-absorbing pad comprising at least one energy absorber connected to the transparent wall and to the supporting structure, the at least one energy absorber comprising an internal absorber attached against the internal face.

20 Claims, 5 Drawing Sheets

(56)　　　　　　References Cited

U.S. PATENT DOCUMENTS

| 6,769,730 | B2 * | 8/2004 | Okamoto .................. B60J 1/02 |
| | | | 296/84.1 |
| 11,827,332 | B2 * | 11/2023 | Reichensperger .... B64C 1/1492 |
| 2016/0264230 | A1 | 9/2016 | Lu et al. |
| 2017/0129587 | A1 | 5/2017 | Sumner et al. |
| 2018/0208325 | A1 | 7/2018 | Prud |
| 2020/0180748 | A1 | 6/2020 | Reichensperger et al. |

FOREIGN PATENT DOCUMENTS

| FR | 2058954 | A5 | 5/1971 | |
| WO | WO-03047848 | A1 * | 6/2003 | ............. F16F 7/121 |
| WO | 2014183614 | A1 | 11/2014 | |

OTHER PUBLICATIONS

Extended European Search Report for European Patent Application No. 25169547.4-1009, Completed by the European Patent Office, dated Sep. 8, 2025, 16 pages (including English machine translation).

\* cited by examiner

AIRCRAFT WITH A TRANSPARENT WALL FIXED TO A STRUCTURE VIA A SHOCK PROTECTION SYSTEM

CROSS REFERENCE TO RELATED APPLICATION

This application claims priority to French patent application No. FR 24 06768 filed on Jun. 24, 2024, the disclosure of which is incorporated in its entirety by reference herein.

TECHNICAL FIELD

The present disclosure relates to an aircraft provided with a transparent wall fixed to a structure via a shock protection system.

BACKGROUND

An aircraft conventionally comprises at least one transparent wall allowing an occupant of the aircraft to see the external environment. For example, a transparent wall may be made from poly(methyl methacrylate), or may take the form of a glass-based multilayer wall or even a multi-material wall, or the like.

According to the prior art, a transparent wall may be glued and/or screwed to a supporting structure of the aircraft. Alternatively, the transparent wall may be disposed in a frame that is glued and/or screwed to such a supporting structure.

A transparent wall may, in particular, be an element of a windscreen or a window directed according to the forward movement of an aircraft. Such a transparent wall may be exposed to shocks, in particular in flight with a bird.

In the event of shocks with a bird, it is essentially the transparent wall that absorbs the energy resulting from the impact in the presence of a transparent wall screwed and/or glued to a supporting structure, directly or via a frame.

The transparent walls are then dimensioned to withstand bird strikes in accordance with the requirements of the certification regulations.

Document CA3066586 A1 suggests making a windscreen with a plurality of different transparent walls, to avoid replacing the entire windscreen in the event of destructive shocks with a bird.

Document US 2017/0129587 A1 proposes attaching a windscreen to a supporting structure by metal or composite material straps. The straps are independent and screwed to the edges of the windscreen. The straps are intended to reduce or prevent cracking, breakage, damage to the supporting structure, or separation of the windscreen.

Document US 2016/0264230 A1 describes a windscreen having a first thickness and a second thickness that are different.

Documents US 2020/180748 A1 and WO 2014/183614 A1 disclose helicopter windscreen fixation structures wherein a flexible component or elastic damper is interposed between a transparent windscreen and a frame of the helicopter.

Documents US 2018/208325 A1 and FR 2 058 954 A5 describe other energy absorption systems and are far from the disclosure.

SUMMARY

An object of the present disclosure is thus to propose an aircraft provided with a transparent wall fixed to a supporting structure in an innovative manner, for example in order to be able to use a lightweight transparent wall.

The disclosure seeks to provide an aircraft provided with a transparent wall interposed between an internal environment situated in the aircraft and an external environment, the transparent wall being fixed to a supporting structure of the aircraft by a fixing system, the transparent wall having an internal face facing the internal environment and an external face facing the external environment.

The fixation system comprises at least one martyr energy-absorbing pad configured to deform according to an irreversible plastic deformation, said energy-absorbing pad comprising at least one energy absorber secured, for example directly or indirectly via an intermediate piece, to the transparent wall and to the supporting structure, said at least one energy absorber comprising an internal absorber mechanically connected at least to the internal face.

The internal absorber is mechanically connected to the internal face, namely fixed directly or indirectly via at least one other connection member to the internal face, but is not necessarily connected to the external face of the transparent wall. On the other hand, an optional external absorber, described below and distinct from the internal absorber, can be mechanically connected at least to the external face, directly or indirectly via an intermediate member.

The transparent wall may be a wall that may be impacted by a bird during a forward flight. For example, the transparent wall may be a windscreen wall, or a window.

Therefore, this transparent wall is attached to the supporting structure, not simply by glue, rivets and/or screws or even a bracket, but by means of one or more plastically deformable energy-absorbing pads.

In the event of impact with a bird, the transparent wall deforms. If the shock occurs at low speed and/or with a bird having a low mass for example, the transparent wall can absorb the resulting energy, the one or more energy-absorbing pads optionally being able to deform elastically.

On the other hand, in the presence of a significant shock, this deformation induces the plastic deformation of one or more martyr energy absorbers. The term "martyr" refers to this irreversible plastic deformation. This or these energy absorbers thus absorb part of the energy resulting from the shock. When the aircraft returns, the one or more energy-absorbing pads can be replaced during a maintenance operation.

Compared with a conventional aircraft, the disclosure thus enables the use of transparent walls that are potentially thinner, and therefore lighter, in order to withstand a same impact with a bird in flight, and/or can make it possible to withstand a more violent impact.

The aircraft may also comprise one or more of the following features, taken individually or in combination.

According to one possibility, the internal absorber may be fixed to the transparent wall directly or via a bracket.

Thus, the internal absorber may be glued and/or screwed, or even riveted, to the transparent wall so as to be attached to the internal face. A deformation of the transparent wall can then generate a force stressing the internal absorber.

Alternatively, the transparent wall may be secured to a bracket, the internal absorber being fixed to this bracket. For example, the bracket is glued to the transparent wall, and the internal absorber can be glued and/or screwed, or even riveted to the bracket. This variant may make it possible to not pierce the transparent wall, for example.

According to one possibility compatible with the preceding possibilities, the internal absorber may be fixed to the supporting structure or to an internal support fixed to the supporting structure.

Hereinafter the term "support" means a structural member, such as an optionally folded plate for example, capable of mechanically connecting two parts. A support may be a portion of a frame.

Thus, the internal absorber may be fixed directly to the supporting structure, for example by gluing and/or screwing and/or riveting. Fixation by gluing has the advantage of not requiring the internal absorber to be pierced.

Alternatively, the internal absorber may be fixed indirectly to the supporting structure. In this case, the internal absorber may be fixed to an internal support, for example by gluing and/or screwing and/or riveting. This internal support is then fixed to the supporting structure, also for example by gluing and/or screwing and/or riveting. This alternative has the advantage of enabling the internal absorber to be mounted entirely outside the aircraft, and to simply fix the internal support to the supporting structure during an assembly phase.

According to one possibility compatible with the preceding possibilities, said at least one energy absorber may comprise an external absorber mechanically connected to at least the external face and fixed to the supporting structure or to an external support fixed to the supporting structure.

In this case, the energy absorber may comprise two absorbers on either side of the transparent wall in order to optimize the absorption of energy, in particular in two opposite directions. When the transparent wall deforms following an impact, one of the two internal and external absorbers may initially deform, the other absorber deforming in a second step.

The external absorber may be fixed directly to the supporting structure, for example by gluing and/or screwing and/or riveting. Fixation by gluing has the advantage of not requiring the external absorber to be pierced.

Alternatively, the external absorber may be fixed indirectly to the supporting structure. In this case, the external absorber may be fixed to an external support, for example by gluing and/or screwing and/or riveting. This external support is also fixed to the supporting structure, for example by gluing and/or screwing and/or riveting. This alternative has the advantage of allowing the external absorber to be mounted entirely outside the aircraft, and of simply fixing the external support to the supporting structure during an assembly phase.

The external absorber may be fixed directly to the transparent wall, for example by gluing and/or screwing and/or riveting, or indirectly for example by means of the aforementioned bracket. Optionally, said external absorber may be glued and/or screwed, or even riveted, to the transparent wall so as to be attached to the external face. A deformation of the transparent wall can then generate a force stressing the external absorber.

In the presence of an energy-absorbing pad provided with both an internal absorber and an external absorber, said internal absorber and said external absorber of a same energy-absorbing pad may be symmetrical with respect to the transparent wall.

The internal absorber and the external absorber may be identical. Alternatively, they may be different, namely of different shape and/or dimensions, depending on the stresses to be supported.

Optionally, when the internal absorber is fixed to the internal support and the external absorber is fixed to the external support, the aircraft may include a frame including the external support and the internal support.

The transparent wall can be pre-equipped by being fixed to a frame via the one or more energy-absorbing pads. The frame is then fixed in the usual way to the supporting structure.

According to one possibility compatible with the preceding possibilities, in general, two energy absorbers may be different, namely of different shape and/or dimensions, whether these energy absorbers are of the internal or external absorber type. For example, the features of two energy absorbers may vary depending on their location.

For example, the fixing system may comprise at least two said energy absorbers having different stiffnesses along a same axis, and for example along an axis perpendicular to the transparent wall.

In another aspect, an energy absorber, whether an internal absorber or an external absorber, may be made according to various variants.

According to one possibility compatible with the preceding possibilities and a first variant, at least one energy absorber may comprise a z-shaped structure provided with two end sections connected by an inner section, one of the end sections being secured to the transparent wall directly or via a bracket and the other end section being secured to the supporting structure, directly or indirectly as described above.

Such a z-shaped structure has the advantage of being plastically deformable by being stressed along two axes, and in two opposite directions per axis.

According to one possibility compatible with the preceding possibilities and a second variant, at least one energy absorber may comprise a honeycomb structure.

A honeycomb structure has cells extending along an axis substantially perpendicular locally to the transparent wall.

The cells of this structure can then deform, being crushed, to absorb some of the energy resulting from an impact with the transparent wall.

According to one possibility compatible with the preceding possibilities and a third variant, at least one energy absorber may comprise at least one deformable member in the form of a hollow truncated sphere, the deformable member extending from a circular-arc shaped base to an apex, said base being connected to the transparent wall.

Optionally, a deformable member comprises a platform secured to the base. The platform may be in the form of a disk or a portion of a disk, and is attached to the transparent wall.

A spherical member may be in the shape of a half-sphere, a quarter-sphere, or the like. In the presence of a platform, this platform may be in the shape of a disk in the presence of a hemispherical spherical member, or a half-disk in the presence of a spherical member in the form of a quarter-sphere. The spherical members can then deform, being crushed, to absorb some of the energy resulting from an impact with the transparent wall.

It should be noted that an energy-absorbing pad may be provided with a different internal absorber and external absorber. For example, an internal absorber and an external absorber of a same pad may be of the same variant, but with different dimensional features. According to another example, an internal absorber and an external absorber of a same pad may be made according to different variants.

According to one possibility compatible with the preceding possibilities, the fixing system may comprise a single energy-absorbing pad extending continuously on an edge of the transparent wall.

The energy-absorbing pad then extends along a closed line at the periphery of the transparent wall in order to be stressed regardless of the impact zone. Different sections of the pad may form different energy absorbers, for example, two different sections may have different stiffnesses along a same axis.

According to one possibility compatible with the preceding possibilities, the fixing system may comprise a plurality of energy-absorbing pads spaced apart from one another along an edge of the transparent wall.

A plurality of energy-absorbing pads is then located along the periphery of the transparent wall so that at least one energy-absorbing pad is stressed regardless of the impact zone. At least two energy-absorbing pads may be different, having absorbers of different variants and/or having different dimensions. The energy-absorbing pads may be adapted as a function of the estimated energy to be dissipated in order to optimize the installation, in particular from a mass point of view.

BRIEF DESCRIPTION OF THE DRAWINGS

The disclosure and its advantages appear in greater detail from the following description of examples given by way of illustration with reference to the accompanying figures, wherein.

DETAILED DESCRIPTION

Elements present in more than one of the figures are given the same references in each of them.

Figure 1:
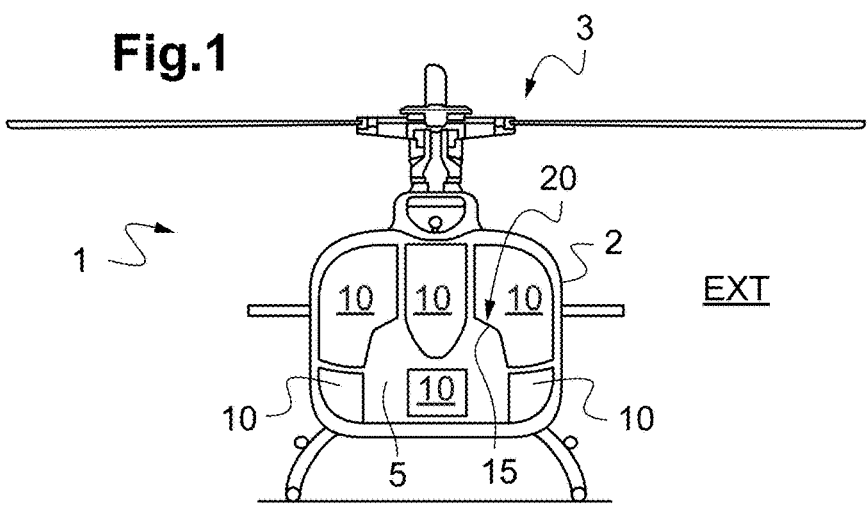
FIG. 1 is a front view of an aircraft according to the disclosure.

FIG. 1 shows an aircraft 1 according to the disclosure. This aircraft 1 has at least one transparent wall 10 supported by a supporting structure 5. Such a transparent wall 10 is interposed between an internal environment situated in the aircraft 1 and an external environment EXT. According to FIG. 2, the transparent wall 10 extends along its thickness from an internal face 11 facing the internal environment INT to an external face 12 facing the external environment EXT.

The one or more transparent walls 10 may be impacted by a bird during flight, particularly when the aircraft 1 is moving forward at high speed.

According to the disclosure, a transparent wall 10 is fixed to the supporting structure 5 by a fixing system 20 for absorbing at least part of the energy resulting from an impact with a bird, by plastic deformation.

Figure 2:
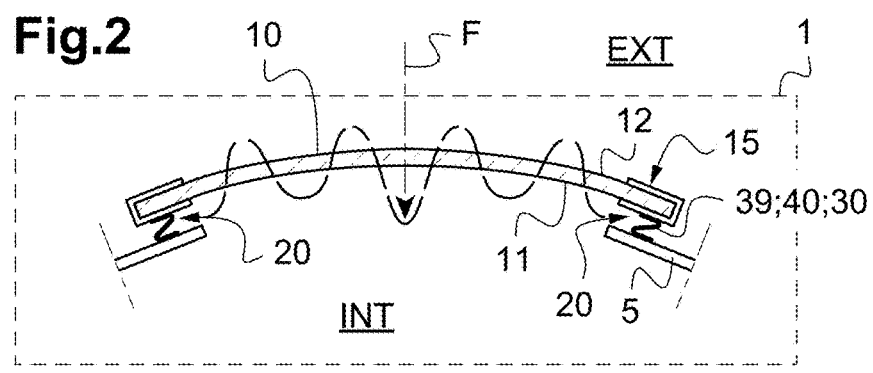
FIG. 2 is a diagram showing a fixation system according to the disclosure.

FIG. 2 shows such a fixing system 20 according to the disclosure.

Figure 3:
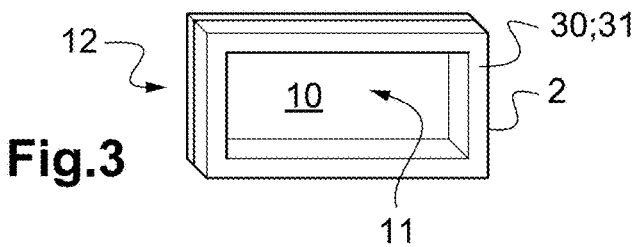
FIG. 3 is a diagram showing a fixation system having a single energy-absorbing pad.
Figure 4:
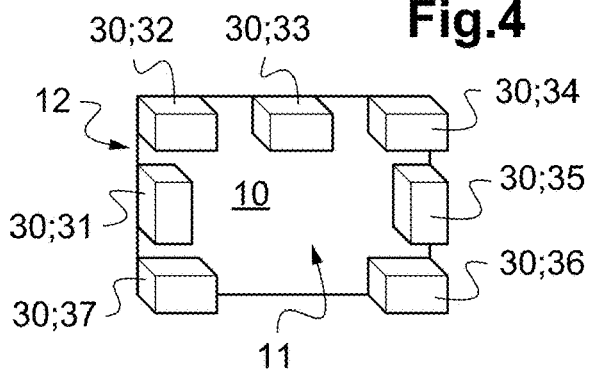
FIG. 4 is a diagram showing a fixation system having a plurality of energy absorbing pads.

This fixing system 20 comprises at least one martyr energy-absorbing pad 30. FIG. 3 illustrates the possibility of having a single energy-absorbing pad 31 that extends continuously on an edge 15 of the transparent wall 10. Conversely, FIG. 4 illustrates the possibility of having a plurality of energy-absorbing pads 32-37 spaced apart from one another along this edge 15.

Reference "30" refers to any energy-absorbing pad, while references 31 to 37 refer to particular energy absorbing pads if required.

With reference to FIG. 2, and independently of the number of energy-absorbing pads 30, an energy-absorbing pad 30 according to the disclosure comprises at least one martyr energy absorber 39 that is secured directly or indirectly to the transparent wall 10 and to the supporting structure 5. Different sections of an energy-absorbing pad may form different energy absorbers, e.g., of different stiffnesses.

Consequently, when a bird impacts the transparent wall 10 in the direction of arrow F, the transparent wall 10 may deform, for example by following a waveform illustrated by the broken lines. In the presence of a shock generating low energy, the transparent wall 10 deforms elastically and returns to its initial state. Optionally, an energy-absorbing pad 30 may deform elastically. In the presence of a shock generating significant energy, at least one energy-absorbing pad 30 plastically deforms and then absorbs part of the energy resulting from the shock. The term "martyr" refers to such plastic deformation. The term "sacrificial" may also be used to qualify the one or more energy absorbers.

Figure 5:
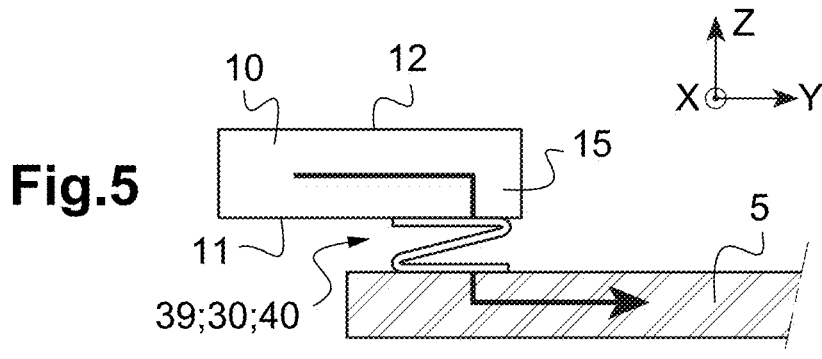
FIG. 5 is a diagram showing an energy-absorbing pad having an internal absorber fixed directly to the supporting structure.

As a minimum and with reference to FIG. 5, an energy-absorbing pad comprises an energy absorber 39 of the internal absorber type 40 connected to the internal face 11. According to the example in FIG. 5, the internal absorber 40 is attached to the internal face 11. The internal absorber 40 may be fixed to the transparent wall 10 for example by gluing and/or screwing and/or riveting, and optionally by being glued to the internal face 11.

In addition, the internal absorber 40 is fixed directly or indirectly to the supporting structure 5.

According to FIG. 5, the internal absorber 40 is fixed directly to the supporting structure 5 by gluing and/or screwing and/or riveting for example.

Figure 6:
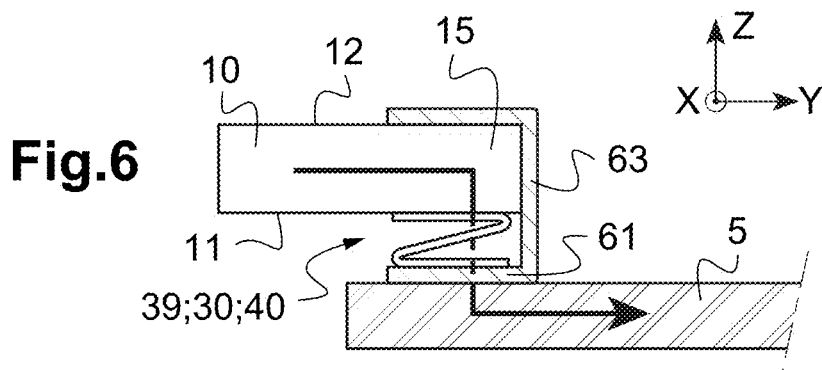
FIG. 6 is a diagram showing an energy-absorbing pad having an internal absorber fixed indirectly to the supporting structure.

According to FIG. 6, the internal absorber 40 is fixed to an internal support 61, for example by gluing and/or screwing and/or riveting. The internal support 61 is then fixed to the supporting structure 5 for example by gluing and/or screwing and/or riveting. This internal support 61 may comprise at least one plate shaped to connect the internal absorber 40 to the supporting structure 5. For example, this internal support 61 is a portion of a frame 63 that surrounds the edge 15 of the transparent wall 10.

Figure 7:
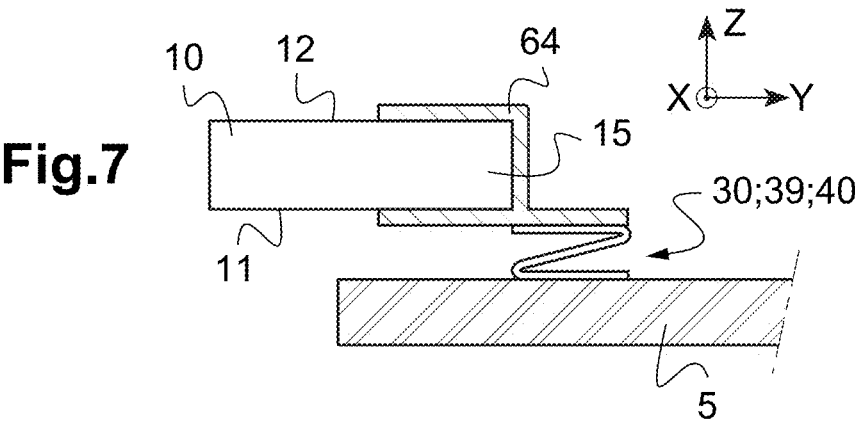
FIG. 7 is a diagram showing an energy-absorbing pad having an internal absorber fixed indirectly to the transparent wall.

According to the example in FIG. 7, the internal absorber 40 is indirectly mechanically connected to the internal face 11. In particular, a bracket 64 is secured to the edge 15 of the transparent wall 10, the internal absorber 40 being fixed to this bracket 64. The internal absorber 40 can then be fixed to the supporting structure 5, either directly according to the example shown or via an internal support according to a variant not shown so as not to unnecessarily multiply the figures.

Figure 8:
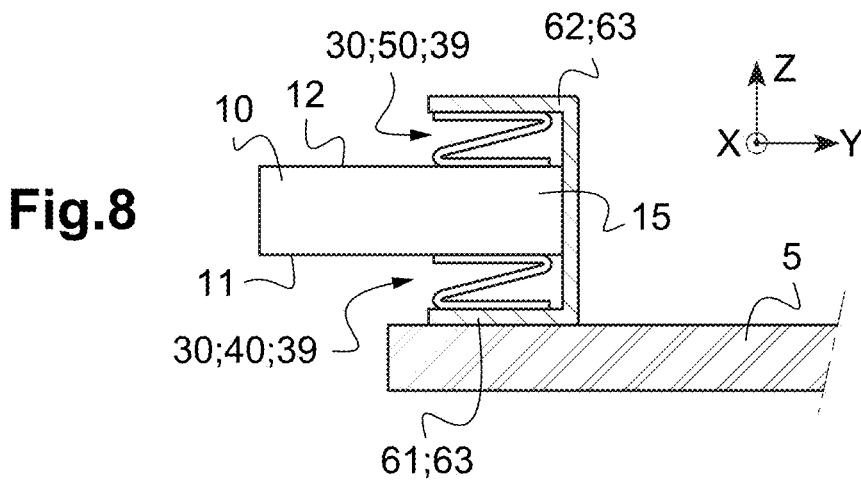
FIG. 8 is a diagram showing an energy-absorbing pad having an external absorber fixed indirectly to the supporting structure.
Figure 9:
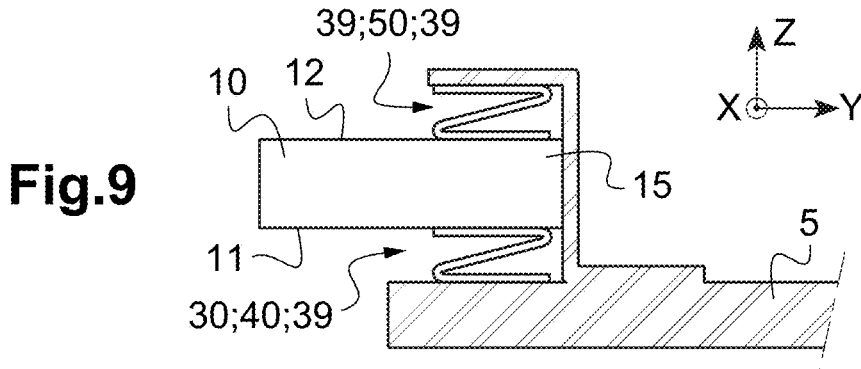
FIG. 9 is a diagram showing an energy-absorbing pad having an external absorber fixed directly to the supporting structure.
Figure 10:
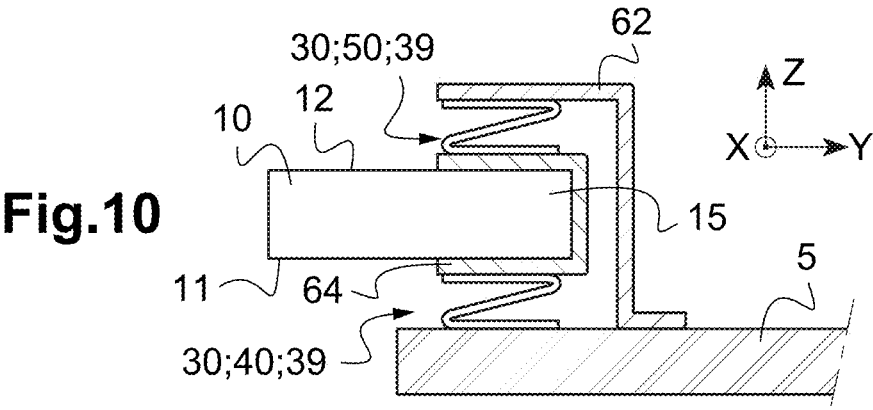
FIG. 10 is a diagram showing an energy-absorbing pad having an external absorber fixed indirectly to the transparent wall.

Optionally and with reference to FIGS. 8 to 10, an energy-absorbing pad 30 may comprise an external absorber type energy absorber 50 connected to the external face 2. The internal absorber 40 and the external absorber 50 of a same energy-absorbing pad 30 are located on either side of the transparent wall 10 and may be identical or different. The internal absorber 40 and the external absorber 50 of a same energy-absorbing pad 30 may be symmetrical with respect to the transparent wall 10.

For example, the external absorber 50 may be fixed to the transparent wall 10 directly, for example by gluing and/or screwing and/or riveting, and optionally by being glued to the external face 12, or indirectly via a bracket that surrounds the edge 15 of the transparent wall 10, for example.

In addition, the external absorber 50 is fixed directly or indirectly to the supporting structure 5.

According to FIG. 8, the external absorber 50 is fixed to an external support 62, for example by gluing and/or screwing and/or riveting. The external support 62 is then fixed to the supporting structure 5 for example by gluing and/or screwing and/or riveting. The outer support 62 may comprise at least one plate that is shaped to connect the external absorber 50 to the supporting structure 5. For example, this external support 62 is a portion of a frame 63 that surrounds the edge 15 of the transparent wall 10, this frame 63 may also comprise the internal support 61.

The internal absorber 40 may be fixed to the internal face directly as in the example shown, or via a bracket. In addition, the internal absorber 40 may be fixed to the supporting structure directly, or via an internal support 61 as in the example shown. The internal support 61 may be a portion of a frame 63 that surrounds the edge 15.

According to FIG. 9, the external absorber 50 is fixed directly to the supporting structure 5 by gluing and/or screwing and/or riveting. The internal absorber 40 may be fixed to the internal face directly as in the example shown, or via a bracket. In addition, the internal absorber 40 may be fixed to the supporting structure directly as in the example shown, or via an internal support 61.

According to the example in FIG. 10, the internal absorber 40 and the external absorber of a same pad 50 are fixed to a bracket 64 that surrounds the edge 15 of the transparent wall.

Figure 11:
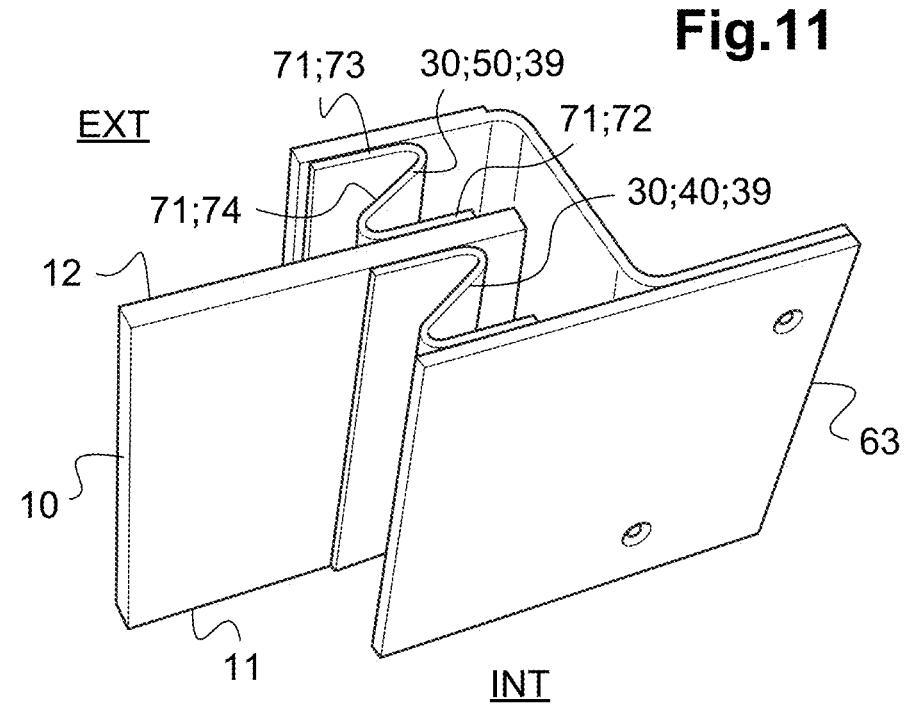
FIG. 11 is a diagram showing an energy absorber having a Z-shaped structure.
Figure 12:
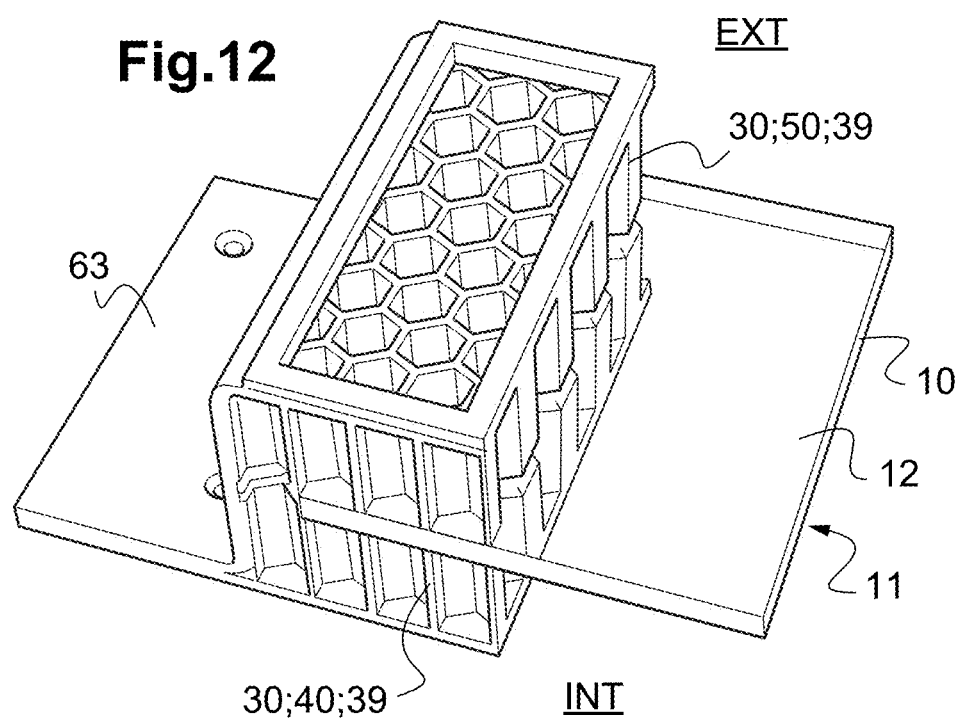
FIG. 12 is a diagram showing an energy absorber having a honeycomb structure.
Figure 13:
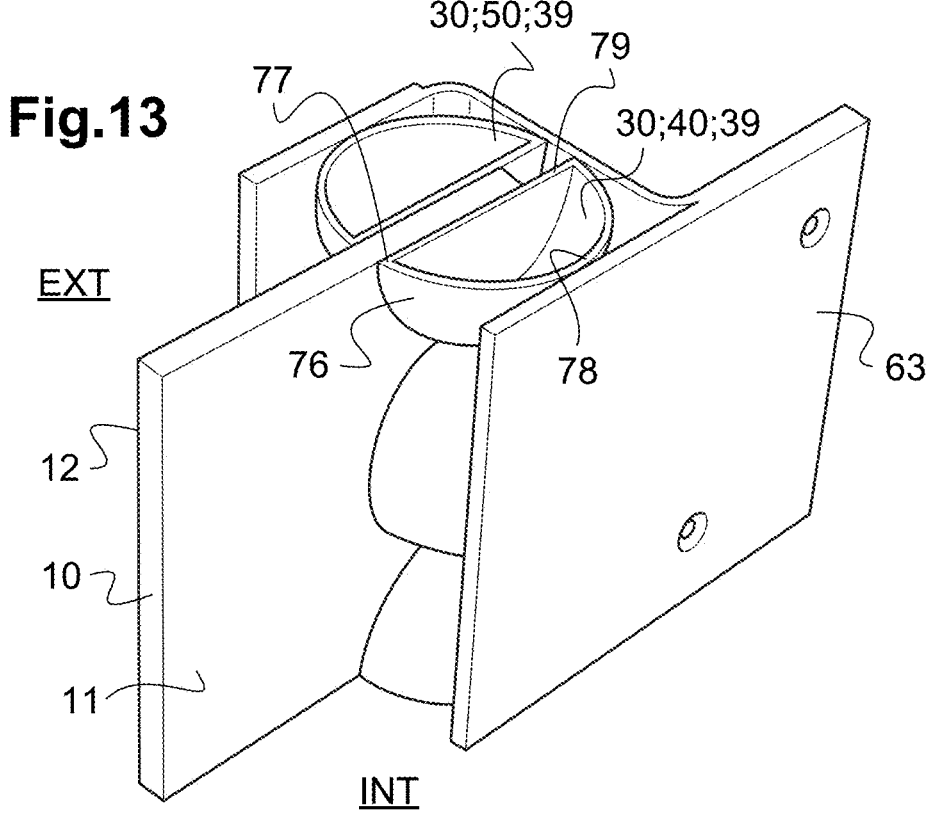
FIG. 13 is a diagram showing an energy absorber having a structure provided with at least one hollow spherical member.

FIGS. 11 to 13 illustrate various possible variants of energy absorbers. Although these FIGS. 11 to 13 illustrate an energy-absorbing pad 30 having an identical internal absorber 40 and external absorber 50, it is obviously possible to have different internal 40 and external 50 absorbers within a single energy-absorbing pad 30, or even not to have an external absorber 50. Although these FIGS. 11 to 13 illustrate an energy-absorbing pad 30 having an internal absorber 40 and an external absorber 50 fixed directly to the transparent wall 10 and to a frame 63, it is obviously possible to have internal 40 and external 50 absorbers fixed indirectly or directly to the transparent wall 10 and to the supporting structure 5 in accordance with the various examples mentioned above.

According to FIG. 11, at least one energy absorber 39 comprises a z-shaped structure 71. This z-shaped structure 71 is thus provided with two substantially parallel end sections 72, 73, connected by an oblique inner section 74. One of the end sections 72 is then secured, or attached, to the transparent wall 10, and the other end section 73 is secured, or attached, to the supporting structure 5 or to a support 71, 72.

According to FIG. 12, at least one energy absorber 39 comprises a honeycomb structure 75. A honeycomb structure 75 has cells that extend in a direction substantially perpendicular locally to the transparent wall 10.

According to FIG. 13, at least one energy absorber 39 has at least one hollow spherical member 76, and in particular three spherical members according to the examples. Each spherical member has the shape of a truncated sphere. Thus, each spherical member extends from a base 77 describing a circular arc to an apex 78. The base 77 is then connected to the transparent wall 10, for example by gluing. The apex 78 is conversely fixed to the supporting structure 5 or to a support 61, 62. In addition, a deformable member may comprise a platform 79 secured to the base 77.

Naturally, the present disclosure may be subjected to numerous variations as to its implementation. Although several embodiments are described above, it should readily be understood that it is not conceivable to identify exhaustively all the possible embodiments. It is of course possible to replace any of the means described with equivalent means without going beyond the ambit of the present disclosure.

For example, although FIGS. 3 and 4 illustrate pads having only internal absorbers, at least one of the pads may also have an external absorber.

It is also possible to add to the embodiment of FIG. 7 an external absorber fixed to the bracket 64 or to the external face 12.

According to another example, a fixation system comprises at least two different energy absorbers, for example of different stiffnesses along a same axis. By way of illustration, two energy-absorbing pads according to FIG. 4 have two energy absorbers of the same shape but different stiffnesses, for example by means of different local thicknesses. According to another example, the pad of FIG. 3 comprises two sections forming two energy absorbers of the same shape but of different stiffnesses.

What is claimed is:

1. An aircraft provided with a transparent wall interposed between an internal environment situated in the aircraft and an external environment, the transparent wall being fixed to a supporting structure of the aircraft by a fixing system, the transparent wall having an internal face facing the internal environment and an external face facing the external environment, wherein the fixing system comprises at least one martyr energy-absorbing pad configured to deform according to an irreversible plastic deformation, the energy-absorbing pad comprising at least one energy absorber secured to the transparent wall and to the supporting structure, the at least one energy absorber comprising an internal absorber mechanically connected at least to the internal face;

wherein the at least one energy absorber comprises an external absorber mechanically connected to at least the external face and fixed to the supporting structure or to an external support fixed to the supporting structure.

2. The aircraft according to claim 1, wherein the internal absorber is fixed to the supporting structure or to an internal support fixed to the supporting structure.

3. The aircraft according to claim 2, wherein the internal absorber is fixed to the internal support fixed to the supporting structure, and the external absorber is fixed to the external support fixed to the supporting structure, and the aircraft comprises a frame comprising the external support and the internal support.

4. The aircraft according to claim 1, wherein the internal absorber is fixed to the transparent wall directly or via a bracket.

5. The aircraft according to claim 1, wherein the internal absorber and the external absorber of a same energy-absorbing pad are symmetrical with respect to the transparent wall.

6. The aircraft according to claim 1, wherein the at least one energy absorber comprises at least two energy absorbers, and the fixing system comprises the at least two energy absorbers having different stiffnesses along a same axis.

7. The aircraft according to claim 1, wherein the at least one energy absorber comprises a z-shaped structure provided with two end sections connected by an inner section, one of the end sections being secured to the transparent wall directly or via a bracket, and the other end section being secured to the supporting structure.

8. The aircraft according to claim 1, wherein the at least one energy absorber comprises a honeycomb structure.

9. The aircraft according to claim 1, wherein the at least one energy absorber has at least one deformable member in the form of a hollow truncated sphere, the deformable member extending from a circular-arc shaped base to an apex, the base being connected to the transparent wall.

10. The aircraft according to claim 1, wherein the at least one martyr energy-absorbing pad comprises a single energy-absorbing pad, and the single energy-absorbing pad extends continuously on an edge of the transparent wall.

11. The aircraft according to claim 1, wherein the at least one martyr energy-absorbing pad comprises a plurality of energy-absorbing pads spaced apart from each other along an edge of the transparent wall.

12. An aircraft having a support structure and a transparent wall, the transparent wall disposed between an internal environment in the aircraft and an external environment, the transparent wall fixed to the support structure of the aircraft by a fixing system, the transparent wall having an internal face facing the internal environment and an external face facing the external environment, wherein the fixing system comprises an energy-absorbing pad configured to deform according to an irreversible plastic deformation, the energy-absorbing pad comprising an energy absorber secured to the transparent wall and to the support structure, the energy absorber comprising an internal absorber mechanically connected to the internal face;

wherein the energy absorber comprises an external absorber mechanically connected to the external face and fixed to the support structure or to an external support fixed to the support structure.

13. The aircraft according to claim 12, wherein the internal absorber is fixed to the supporting structure or to an internal support fixed to the supporting structure.

14. The aircraft according to claim 13, wherein the external absorber is fixed to the external support fixed to the supporting structure, and the internal absorber is fixed to the internal support, and the aircraft comprises a frame comprising the external support and the internal support.

15. The aircraft according to claim 12, wherein the internal absorber is fixed to the transparent wall directly or via a bracket.

16. The aircraft according to claim 12, wherein the internal absorber and the external absorber of a same energy-absorbing pad are symmetrical with respect to the transparent wall.

17. The aircraft according to claim 12, wherein the energy absorber comprises two energy absorbers, and the fixing system comprises the two energy absorbers having different stiffnesses along a same axis.

18. The aircraft according to claim 12, wherein the energy absorber comprises a z-shaped structure provided with two end sections connected by an inner section, one of the end sections secured to the transparent wall directly or via a bracket, and the other end section secured to the supporting structure.

19. The aircraft according to claim 12, wherein the energy-absorbing pad comprises a plurality of energy-absorbing pads spaced apart from each other along an edge of the transparent wall.

20. An aircraft having a support structure and a transparent wall, the transparent wall disposed between an internal environment in the aircraft and an external environment, the transparent wall fixed to the support structure of the aircraft, the transparent wall having an internal face facing the internal environment and an external face facing the external environment, a single energy-absorbing pad secured to the transparent wall and to the support structure, the energy-absorbing pad configured to deform according to an irreversible plastic deformation, the energy-absorbing pad comprising an internal absorber mechanically connected to the internal face and an external absorber connected to the external face and fixed to the support structure, the internal absorber and the external absorber form respective portions of the single energy-absorbing pad.

* * * * *